United States Patent [19]

Prasad et al.

[11] Patent Number: 4,714,982

[45] Date of Patent: Dec. 22, 1987

[54] SUBSTRATE FOR A SEMICONDUCTOR PACKAGE HAVING IMPROVED I/O PIN BONDING

[75] Inventors: Chandrika Prasad, Poughkeepsie; Andrew F. Szewczyk, Troy, both of N.Y.

[73] Assignee: International Business Machines Corporation, Armonk, N.Y.

[21] Appl. No.: 843,472

[22] Filed: Mar. 24, 1986

Related U.S. Application Data

[62] Division of Ser. No. 626,185, Jun. 29, 1984, Pat. No. 4,634,041.

[51] Int. Cl.⁴ ............................................. H01L 23/48
[52] U.S. Cl. .................................................... 361/404
[58] Field of Search ................ 361/403, 404; 228/179, 228/180.2, 122-124

[56] References Cited

U.S. PATENT DOCUMENTS

| | | | |
|---|---|---|---|
| 2,568,242 | 9/1951 | Matteson | 228/179 X |
| 2,606,362 | 8/1952 | Martin et al. | 228/263.11 |
| 4,182,628 | 1/1980 | D'Silva | 428/673 X |
| 4,418,857 | 12/1983 | Ainslie et al. | 228/124 |
| 4,488,673 | 12/1984 | Hopper | 228/122 |
| 4,518,112 | 5/1985 | Miller et al. | 228/124 |
| 4,542,438 | 9/1985 | Yamamoto | 228/180.2 |

FOREIGN PATENT DOCUMENTS

1368080  6/1964  France .

OTHER PUBLICATIONS

IBM Technical Disclosure Bulletin, vol. 25, No. 2, p. 571 (Jul. 1982), vol. 26, No. 1, p. 229 (Jun. 1983).

Primary Examiner—Kenneth J. Ramsey
Attorney, Agent, or Firm—Wolmar J. Stoffel; Ira David Blecker

[57] ABSTRACT

A substrate for an integrated circuit semiconductor package with I/O pins joined to the bottom surface, the improvement being the combination of solder wettable pin pads on the bottom surface of the substrate, I/O pins with a diameter less than the diameters of the pin pads, and a brazing material of an alloy that includes Ag, and a metal selected from the group consisting of In and Sn, and mixtures thereof, that exhibits a mushy zone over a predetermined temperature range, the metal disposed only between the pins and pin pads.

5 Claims, 3 Drawing Figures

SUBSTRATE FOR A SEMICONDUCTOR PACKAGE HAVING IMPROVED I/O PIN BONDING

This application is a division of U.S. application Ser. No. 626,185, filed June 29, 1984, now U.S. Pat. No. 4,634,041.

BACKGROUND OF THE INVENTION

1. Field of Invention

This invention relates to the bonding of input/output (I/O) electrical connection pins, and other components, to a chip carrying substrate in an electronic system. More particularly, this invention relates to an electronic circuit interconnection bonding technique for fabrication of chip carrying substrates and more specifically to the bonding of pins thereto in a manner compatible with continuous reheating of chips.

In the semiconductor packaging technology it is frequently necessary and/or advantageous to affix input-/output pins and other current carrying elements to the surface of a substrate having an interconnection network of current carrying lines. A specific example is bonding pins to I/O pads on the bottom surface of a multilayer ceramic (MLC) substrate. The pads are joined to an internal metallurgy system that is connected to integrated circuit devices mounted on the top surface of the substrate. Such a semiconductor package is described and claimed in U.S. Pat. No. 4,245,273. In the manufacture and operation of complex, multi-device packages, it is necessary to repair and/or rework the modules by removing the cover and replacing devices that are defective or defectively joined. This operation inevitably requires reheating of the module and more specifically the substrate. The I/O pins on the substrate should desirably be brazed to the substrate with an alloy that is not significantly affected by reheating of the substrate to temperatures necessary to re-melt the solder. It is conventional to use braze preforms or paste containing a particular alloy to bond pins. The preforms and paste are normally formed of 80-20 AuSn. This alloy is stable, and has a melting point above the melting point of lead/tin solder. Thus, the bond between the pins and the substrate is not melted during rework. However, the cost of this brazing alloy is very expensive because the price of Au is high and the alloy contains a high percentage of Au.

Because of the melting point requirements, the necessity for forming a strong and stable bond for attaching pins that is not affected by environmental conditions, the number of brazing alloys and metals for such use is quite limited. Ag brazing alloys, which are less expensive than Au brazing alloys have not been used because of their high susceptibility for causing failure by electromigration.

A process for forming a strong stable bond between a pin, or other current carrying elements, and a substrate that is also inexpensive is a present pressing need in the semiconductor technology industry.

SUMMARY OF THE INVENTION

An object of this invention is to provide a semiconductor package provided with I/O pins that are bonded by an improved braze bond that is strong, stable and relatively inexpensive.

The bond structure of the invention is an improvement in the context of a multilayer ceramic substrate for an integrated circuit semiconductor package having at least one integrated circuit semiconductor device mounted on the top surface and I/O pins mounted on the bottom surface electrically connected to the device through the internal metallurgy in the substrate. The improved bond structure taken in the context of the aforementioned combination, has a plurality of solder wettable tin pads on the bottom surface of the substrate each having a predetermined diameter, I/O pins, each provided with a flat head with a diameter significantly less than the diameter of the pin pads, and a brazing material of an alloy of Ag/Cu/In or Sn or combinations of In and Sn disposed only between the head of the pin and the central area of the pad, thus bonding the pin to the substrate but leaving a peripheral pad area devoid of brazing alloy.

DESCRIPTION OF THE PREFERRED EMBODIMENT

The problems solved by this invention relate to the brazing of pins or other current carrying elements to a device carrying substrate in a semiconductor package.

Figure 1:
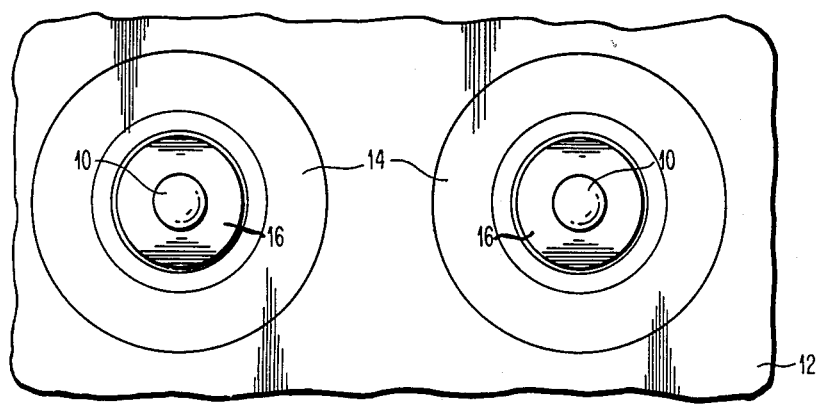
FIG. 1 shows a top view in broken section of a multilayer ceramic substrate carrying two connector pins attached by the process of our invention.
Figure 2:
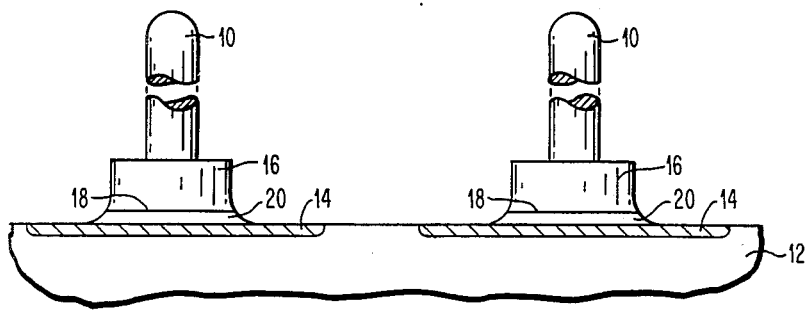
FIG. 2 is an elevational view in broken section illustrating a plurality of pins bonded to a substrate in accordance with the process of our invention.

Referring now to the Figs. of the drawings and in FIGS. 1 and 2 in particular, there is illustrated in broken section two pins 10 bonded to a substrate 12 of dielectric material. In the preferred specific embodiment, substrate 12 is a multilayer ceramic substrate having an internal metallurgy system that interconnects I/O pins on the bottom side of the substrate with semiconductor devices and other elements mounted on the upper or opposite side of the substrate. The fabrication of a multilayer ceramic substrate is well known in the technology and consists basically of forming a ceramic slurry of particulate ceramic material, an organic resin, such as polyvinylbutyral, a solvent for the resin, and various plasticizers and the like. The ceramic slurry is doctor bladed into sheets, the sheets dried, via holes punched through the sheets, and lines screened on the sheets and through the vias. They are then laminated and sintered at relatively high temperatures sufficient to burn off the binders and cause the ceramic particles to fuse. On the top and bottom surfaces, pads for affixing pins, and also to serve as a base for solder pads for connecting semiconductors are formed of a refractory paste. The refractory metal pads are formed on the substrate before it is sintered. Subsequently, the pads of refractory metal are coated with a metal that is solder wettable such as nickel, by various techniques known to the art. In FIGS. 1 and 2, pin pads 14 are illustrated but the interconnection between the pads is not since it is not part of this invention and well known in the art. In the practice of the invention the pins 10 selected to be bonded to the substrate 12 have a head 16 with a flat bottom surface 18. As is evident in FIGS. 1 and 2, the diameter of head 16 is significantly less than the diameter of pad 14. The reason for the smaller head diameter will be evident as the invention is explained in more detail. The pin 10 is bonded to the central portion of pad 14 with a brazing alloy 20 as most clearly shown in FIG. 2. Note that the brazing alloy 20 is confined between the head 16 of pin 10 and the central portion of pad 14 leaving outer peripheral area of pads 14 free of the alloy.

Figure 3:
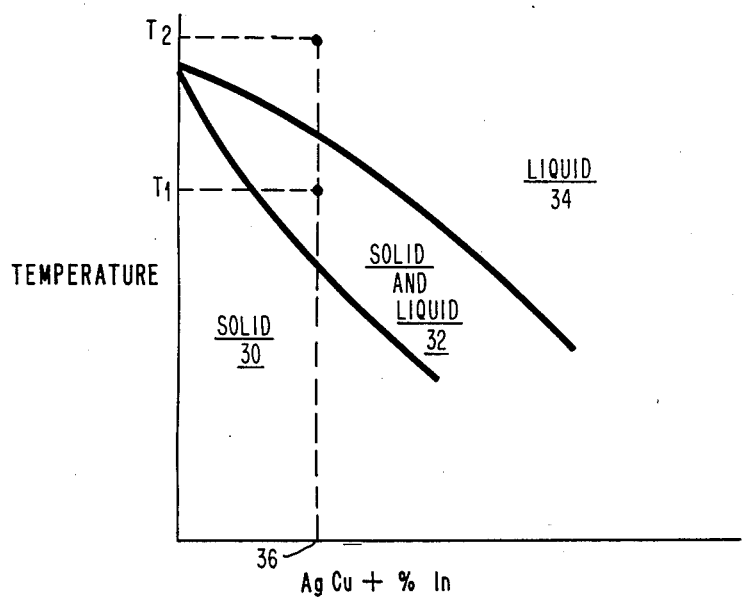
FIG. 3 is a plot of temperature versus alloy composition which illustrates generally the requirements for the alloy used to bond the pins in the process and structure of our invention.

The brazing alloy suitable for use in the practice of our invention must have a "mushy" state over a relatively wide temperature range. This "mushy" state occurs when a liquid phase and a solid phase are present. This is illustrated in FIG. 3 which is a partial phase diagram for an Ag/Cu/In mixture. The phase diagram of FIG. 3 plots temperature versus percent of indium in a given Ag/Cu mixture. Note that in area 30 the mixture is a solid, in area 32 the mixture is a combination of a solid phase and a liquid phase, and in area 34 the mixture exists only as a liquid. In the process the assembly of pin 10, and substrate 12, alloy 20 is introduced as a metal mixture in the form of either a preform or a paste that includes indium at a percent indicated on FIG. 3 as 36, which is heated to temperature T1. The alloy 20 at temperature T1 becomes "mushy". Pressure is applied to force pin 10 toward pad 14 into contact with the alloy preform or paste. When the pressure is applied to the pins 10 the small volume of liquid phase created by the "mushy" zone brazing will wet the surface 18 of pin head 16 and pad 14 to only a limited extent and so create the brazed fillet design indicated in FIG. 2. This is on contrast to prior art brazing which utilize a braze material that melts completely. In such a process the metal would wet the entire surface of pad 14. By this process the peripheral area of pad 14 outside of the head 16 of pin 10 is not coated with the braze material. Migration of the silver in the paste is prevented from occurring across the annular peripheral region of pad 14 due to the equipotential nature of the sintered pad structure. Equipotential means that all lines of electromotive force (emf) are always normal to the pin-I/O structure, no tangential emf components exist. For a fully wetted I/O pad, the emf acting on the braze at the outer pad edge provides the driving force for migration of the braze material. In this migration-resistant pin pad design, braze material must necessarily travel across the braze-free region for migration to occur. As there exists no (necessarily tangential) emf component to cause metal to migrate across the braze-free region, metal migration from one I/O to another is prevented. No potential differences occur radially across the peripheral area and hence no driving force for metal migration between the outside edge of the braze surrounding head 16 and the outside peripheral edge of pad 14 exists. Consequently, braze migration from one I/O pin to another is prevented by this design and the possible system failure is averted. If necessary or desirable, the resistance to electromigration can be further improved by providing a coating of solder or other electrically conductive material that is resistive to electromigration over the surfaces of pin 10 and pad 14.

The dimensions of the pad 14 and pin head 16 can be chosen to best suit the particular application. Preferably, the outer edge of the pin head 16 is displaced inwardly from the outside edge of pad 14 by at least 0.005 inch more preferably in the range of 0.015 to 0.025 inch. The pin does not necessarily have to have a head. Pins used in the practice of this invention can be straight shank without a head. Sufficient strength can be achieved by the braze connection under the headless pin using the alloy of invention and process for binding to allow such use.

The composition of the brazing material is also be chosen to best suit the particular application contemplated for use. As discussed previously, the alloy used must be relatively strong in order to provide a secure bond between the pin and the pad, and must exhibit a transition through a "mushy" state over a relatively wide temperature range in order to make fabrication feasible. In general, the preferred alloy includes a combination of Ag, Cu and In and/or Sn. Preferably, the mixture contains Ag in the range of 60 to 70 wt. %, Cu in an amount in the range of 20 to 30%, and In and/or Sn in an amount in the range of 5 to 20 wt. %. The alloy can include other elements as well, provided that the aforementioned criteria are satisfied. Preferred alloys include a composition consisting of 61 Ag 24 Cu 15 In available from Wesgo Corporation, Belmount, California and sold under the trademark Incusil 15. Another preferred alloy contains 60 Ag 20 Cu 15 In and 5 Sn. Another preferred alloy contains Ag Cu and Sn sold by Wesgo Corporation. The temperature at which the braze material must be heated in order to form a bond is determined by the particular composition and can be evaluated by a phase diagram similar to that illustrated in FIG. 3. Preferably the temperature range for the liquid to remain in a "mushy" state is in the range of 10° C. to 100° C.

With this process I/O pins can be bonded to a substrate with a mixture that includes silver. The use of silver in a brazing mixture provides a bond that is stronger than that of gold/tin, and is significantly less expensive. The known disadvantage of alloys embodying silver, namely that it is prone to electromigration, particularly in damp or moist environments is overcome by providing a peripheral area on the pad that is not wetted by the braze material as discussed previously.

The following examples are directed to preferred specific embodiments of the practice of our invention and should not be construed to unduly limit the scope of the claims defining the invention.

EXAMPLE 1

A number of sintered multi-layer ceramic substrates each having a plurality of I/O pads on one side, were selected. The pads each had a diameter of 0.068 inch, and was formed of an underlying layer of Mo, an intermediate layer of Ni and a thin top protective layer of Au. The substrates were divided into two sets, the first set was used to demonstrate and test where the bonding process and bond structure of the invention, and the second set used to demonstrate and compare bonded pin structure to pads in the conventional manner using Incusil-10 brazing material. The I/O pins to be bonded to the sets of substrates were all similar, and had a pin head diameter of 0.032 inch formed of a Fe-Ni-Co alloy. Braze preforms for the first set of substrates were formed of Incusil-10 material, i.e. 63 Ag 27 Cu 10 In, with a diameter of 0.032, and a thickness of 0.002 inches. Pins with the Incusil preforms on the heads were placed in contact with the pads of the first set of substrates, and the alignment maintained with a brazing fixture. The assemblies were sent through a belt furnace with a peak temperature of 700° C. in a reducing atmosphere. The substrates were allowed to cool and the braze joints inspected. It was noted that the braze material was largely confined to the volume between the pin head and pad. There was an annular area about the edge of the pad which was not covered by braze material. The braze material terminated approximately 0.010 inch from the edge of the pad. The same type of pins were bonded to the pads of the second set of substrates with preforms formed of Incusil-10 material, and of the same approximate size as the previous preforms. Brazing was done in a conventional manner above the liquidus temperature. Inspection of these I/O pins indicated that the braze material extended beyond the I/O pin head and covered the entire pad surface. The bond strength of the braze joint were tested by applying a force to the pin and measuring the force necessary to cause failure. The results are as follows:

|  | Force | | |
| --- | --- | --- | --- |
|  | Highest | Lowest | Average |
| 1st Set | 19 lbs. | 18.1 lbs. | 18.6 lbs. |
| 2nd Set | 19.1 lbs. | 18.0 lbs | 18.5 lbs |

All of the failures occurred at the pin shank which separated before the band between the head and pin pad broke. As the results indicate, the bond strengths between the first and second sets are comparable.

EXAMPLE II

In this Example the electromigration resistance of the I/O pin structure of the invention and the prior art were tested. Two sets of substrates were prepared as described in Example I. A water-drop test was applied to both sets of substrates. In the test two adjacent rows of bonded I/O pins were biased at 20 V in series with a limiting resistor of 47 kilo-ohms. The test started when a drop of D.I. water was applied between the biased pins. The time to failure was recorded with the failure defined as metal migration from one I/O pin to the other I/O pin. In the conventional brazed I/O pin structure, of set 2 of the substrates failure was observed in one minute, average time. In the I/O pin structure of the invention on the substrates of set 1, failure occurred after 12 minutes, average time. Thus the resistance to electromigration in the structure of the invention should better than an order of magnitude improvement.

While the invention has been illustrated and described with reference to preferred embodiments thereof, it is to be understood that the invention is not limited to the precise construction herein disclosed and the right is reserved to all changes and modifications coming within the scope of the invention as defined in the appended claims.

We claim:

1. In a substrate for an integrated circuit semiconductor package having at least one integrated circuit semiconductor device mounted on the top surface, and I/O pins mounted on the bottom surface electrically connected to the device through internal metallurgy in the substrate; the improvement comprising;
   solder wettable pin pads on the bottom surface of said substrate, each having a predetermined area,
   I/O pins bonded to said pin pads, each pin having a bonding surface with an area significantly less than the area of each of said pin pads, said I/O pins located on said pin pads whereby the periphery of each of said pin pads is spaced from the periphery of each of said respective bonding surfaces,
   a brazing material of an alloy that at least includes Ag, and a metal selected from the group consisting of In and Sn and mixtures thereof disposed only between the bonding surfaces of each of said pins and each of the central areas of each of said pin pads thereby bonding the pins to the substrate but leaving peripheral pad areas devoid of brazing alloy.

2. The substrate of claim 1 wherein said peripheral pad area surrounding said pin has a radial width in the range of 0.005 inch to 0.080 inch.

3. The substrate of claim 2 wherein said brazing material is an alloy having a composition that includes Ag in an amount in the range of 60% to 70% by weight, Cu in an amount in the range of 20% to 30% by weight, and In and/or Sn in an amount in the range of 10% to 20% by weight.

4. The substrate of claim 3 wherein said I/O pin and peripheral pad area has a coating layer of Pb-Sn solder.

5. The substrate of claim 4 wherein said I/O pin is formed of Ni, Fe-Ni-Co or Fi-Ni alloys.

* * * * *